United States Patent
Choe et al.

(10) Patent No.: US 12,081,879 B2
(45) Date of Patent: Sep. 3, 2024

(54) METHOD FOR GENERATING IMAGE AND ELECTRONIC DEVICE THEREFOR

(71) Applicant: Samsung Electronics Co., Ltd., Suwon-si (KR)

(72) Inventors: Jihwan Choe, Suwon-si (KR); Jonghwa Yim, Suwon-si (KR); Beomsu Kim, Suwon-si (KR); Wonjoon Do, Suwon-si (KR); Jisung Yoo, Suwon-si (KR); Kwangyong Lim, Suwon-si (KR); Daekyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 17/798,842

(22) PCT Filed: Jan. 19, 2021

(86) PCT No.: PCT/KR2021/000750
§ 371 (c)(1),
(2) Date: Aug. 10, 2022

(87) PCT Pub. No.: WO2021/162263
PCT Pub. Date: Aug. 19, 2021

(65) Prior Publication Data
US 2023/0156349 A1 May 18, 2023

(30) Foreign Application Priority Data
Feb. 10, 2020 (KR) .................. 10-2020-0015687

(51) Int. Cl.
*H04N 23/84* (2023.01)
*G06T 7/90* (2017.01)
*H04N 23/63* (2023.01)

(52) U.S. Cl.
CPC ............ *H04N 23/84* (2023.01); *G06T 7/90* (2017.01); *H04N 23/632* (2023.01); *G06T 2207/10024* (2013.01)

(58) Field of Classification Search
CPC ... H04N 23/63–633; H04N 23/84; G06T 7/90
(Continued)

(56) References Cited

U.S. PATENT DOCUMENTS 6,816,289 B1 11/2004 Kim et al.
8,872,843 B2 10/2014 Nam et al.
(Continued)

FOREIGN PATENT DOCUMENTS

CN  108596830 A  *  9/2018  .............. G06N 3/08
JP  2018-132855       8/2018
(Continued)

OTHER PUBLICATIONS

Extended European Search Report dated Jul. 4, 2023 in counterpart European Patent Application No. 21752930.4.
(Continued)

*Primary Examiner* — Anthony J Daniels
(74) *Attorney, Agent, or Firm* — Nixon & Vanderhye, P.C.

(57) ABSTRACT

According to an embodiment of the present disclosure, an electronic device comprises: a camera; a display; a memory; and at least one processor electrically connected to the display and the memory. The processor obtains an input of selecting a first image, generates a color filter by comparing the first image and a second image having a color pattern different from the first image, obtains a third image, and generates a fourth image by applying the generate color filter to the third image. The processor derives a function by comparing color values of pixels of the first image and the second image, and coefficients of the function. The color
(Continued)

filter may include the function derived by comparing the first image and the second image, the coefficients of the function, and a color lookup table generated on the basis of the derived function. The processor stores the generated color filter in the memory and generates the fourth image by applying the stored color filter to the third image.

16 Claims, 13 Drawing Sheets

(58) Field of Classification Search
USPC .......................................................... 348/221.1
See application file for complete search history.

(56) References Cited

U.S. PATENT DOCUMENTS

| | | | | |
|---|---|---|---|---|
| 8,913,827 | B1* | 12/2014 | Fang | G06T 11/001 |
| | | | | 382/167 |
| 9,857,953 | B2 | 1/2018 | Sunkavalli et al. | |
| 9,959,484 | B2 | 5/2018 | Wang et al. | |
| 10,855,933 | B2 | 12/2020 | Ahn et al. | |
| 10,872,399 | B2* | 12/2020 | Li | G06N 3/088 |
| 11,039,062 | B2 | 6/2021 | Lee et al. | |
| 11,070,717 | B2* | 7/2021 | Cragg | G06V 20/10 |
| 2009/0231355 | A1 | 9/2009 | Perronnin | |
| 2013/0002810 | A1* | 1/2013 | Stauder | H04N 13/15 |
| | | | | 348/42 |
| 2016/0232426 | A1* | 8/2016 | Wang | G06T 5/50 |
| 2017/0139572 | A1 | 5/2017 | Sunkavalli et al. | |
| 2017/0337708 | A1* | 11/2017 | Bordes | G06T 5/007 |
| 2019/0045165 | A1 | 2/2019 | Rivard | |
| 2019/0116313 | A1 | 4/2019 | Jang | |
| 2019/0124272 | A1* | 4/2019 | O'Neill | H04N 23/63 |
| 2019/0279402 | A1* | 9/2019 | Panetta | G06T 7/10 |
| 2021/0150310 | A1* | 5/2021 | Wu | G06T 7/30 |
| 2021/0256304 | A1* | 8/2021 | Hsiao | G06F 18/213 |
| 2022/0044054 | A1* | 2/2022 | Shen | G06V 10/44 |

FOREIGN PATENT DOCUMENTS

| | | | |
|---|---|---|---|
| JP | 2019-117558 | 7/2019 | |
| KR | 10-2014-0073327 | 6/2014 | |
| KR | 10-2016-0108827 | 9/2016 | |
| KR | 10-1727169 | 4/2017 | |
| KR | 10-2018-0108041 | 10/2018 | |
| KR | 10-2019-0027598 | 3/2019 | |
| KR | 10-2019-0092995 | 8/2019 | |
| KR | 10-2019-0142397 | 12/2019 | |
| KR | 10-20200071031 A * | 6/2020 | H04N 23/63 |
| WO | 2018/208038 | 11/2018 | |

OTHER PUBLICATIONS

Duiker, Haarm-Pieter, "LUTRecover—Colo(u)r—Blink—Nukepedia," https://github.com/hpd/general/blob/maser/blink/LUTRecover.blink, Sep. 1, 2015, XP093057461, 2 pages.
Duiker, Haarm-Pieter, "LUTApply—Colo(u)r—Blink—Nukepedia," http://www.nukepedia.com/blink/colour/lutapply, Oct. 22, 2015, XP093057465, 2 pages.
Anonymous, "Creating a LUT out of a difference between two images—Legacy ImageMagick Discussions Archive," Sep. 25, 2015, XP093057467, 2 pages.
International Search Report for PCT/KR2021/000750 mailed May 20, 2021, 5 pages.
Written Opinion of the ISA for PCT/KR2021/000750 mailed May 20, 2021, 7 pages.
Office Action dated Dec. 15, 2023 in IN Application No. 202217051089 and English-language translation.
Office Action dated Jan. 31, 2024 in KR Application No. 10-2020-0015687 and English-language translation.

* cited by examiner

METHOD FOR GENERATING IMAGE AND ELECTRONIC DEVICE THEREFOR

This application is the U.S. national phase of International Application No. PCT/KR2021/000750 filed Jan. 19, 2021 which designated the U.S. and claims priority to KR 10-2020-0015687 filed Feb. 10, 2020, the entire contents of each of which are hereby incorporated by reference.

BACKGROUND

Field

The disclosure relates to an electronic device for generating an image and a method of generating an image of an electronic device.

Description of Related Art

Among various functions capable of editing photos, a filter function is a function of applying various effects to photos to make the photo have a special atmosphere. When one filter function is selected for one photo, the same effect corresponding to the selected filter function is applied to all photos. A user may select a filter effect stored in an electronic device so as to apply the stored filter effect to a desired image.

SUMMARY

When a filter is applied to an image, a filter effect already stored in the electronic device is applied or a created filter is selectively downloaded and used, and thus there may be no filter which the user desires. A style transfer scheme which is one of the conventional methods of generating a desired filter needs a predetermined time and a large storage space to process a procedure of encoding and decoding a style image.

Further, it is difficult to separate and extract only the filter effect from the style input image, and thus it is impossible to apply only the filter effect such as a color, brightness, or contrast which the user desires. Since texture corresponding to an unnecessary element is also applied, it is difficult to generate a desired image.

The technical subjects pursued in the disclosure may not be limited to the above mentioned technical subjects, and other technical subjects which are not mentioned may be clearly understood, through the following descriptions, by those skilled in the art of the disclosure.

According to an embodiment of the disclosure, an electronic device includes a camera, a display, a memory, and at least one processor electrically connected to the display and the memory, wherein the at least one processor is configured to acquire an input of selecting a first image, generate a color filter through comparison between the first image and a second image having a color pattern different from the first image, acquire a third image, and apply the generated color filter to the third image to generate a fourth image. According to an embodiment of the disclosure, a method of controlling an electronic device includes acquiring an input of selecting a first image by at least one processor electrically connected to a camera, a display, and a memory, generating a color filter through comparison between the first image and a second image having a color pattern different from the first image, acquiring a third image, and applying the generated color filter to the third image.

According to various embodiments, a processing speed is high and a small storage space is needed to generate a filter since a process of compressing and decoding a style image is not required, thereby reducing power consumption.

According to various embodiments, it is possible to improve user convenience by generating a filter from an image having a color which a user desires and storing the generated filter to continuously applying the same.

DETAILED DESCRIPTION

Hereinafter, various embodiments of the disclosure are described with reference to the accompanying drawings. For convenience of description, the size of elements illustrated in figures may be exaggerated or reduced, and the disclosure is not necessarily limited by illustration.

Figure 1:
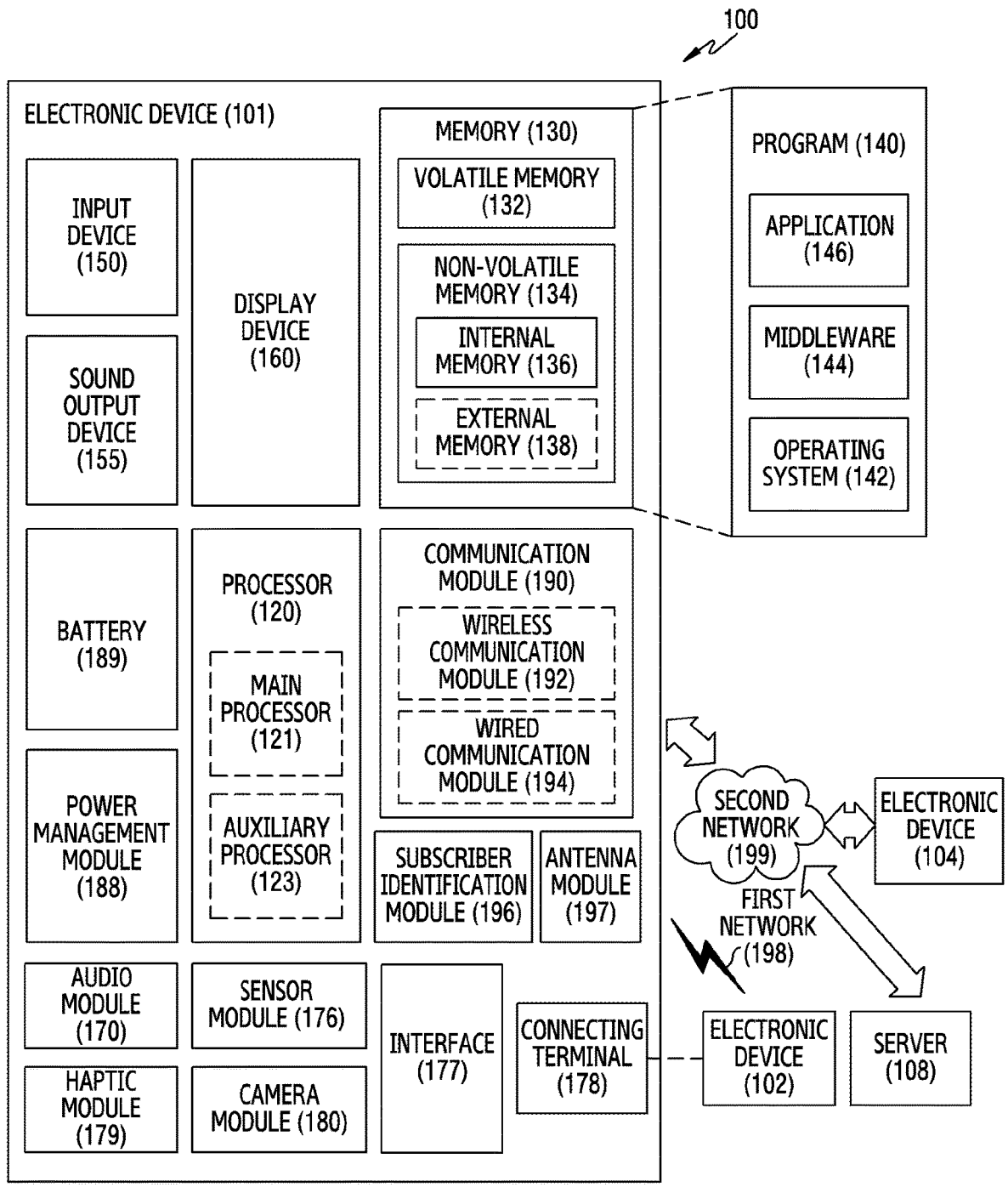
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
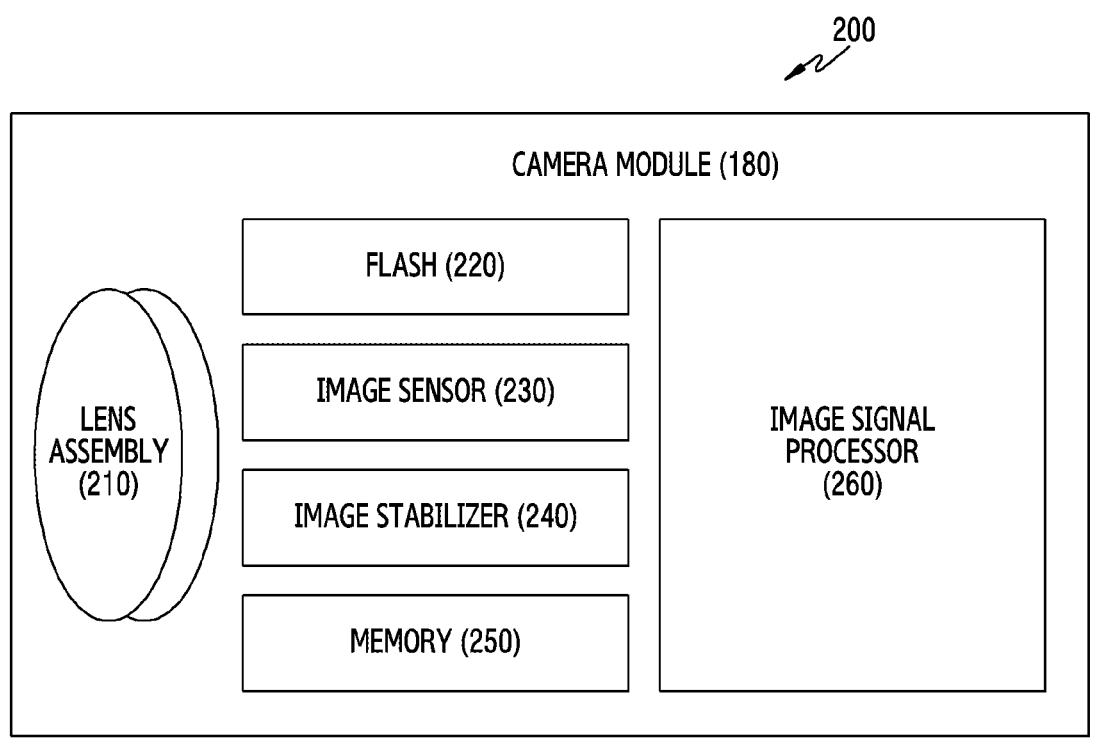
FIG. 2 is a block diagram illustrating the camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
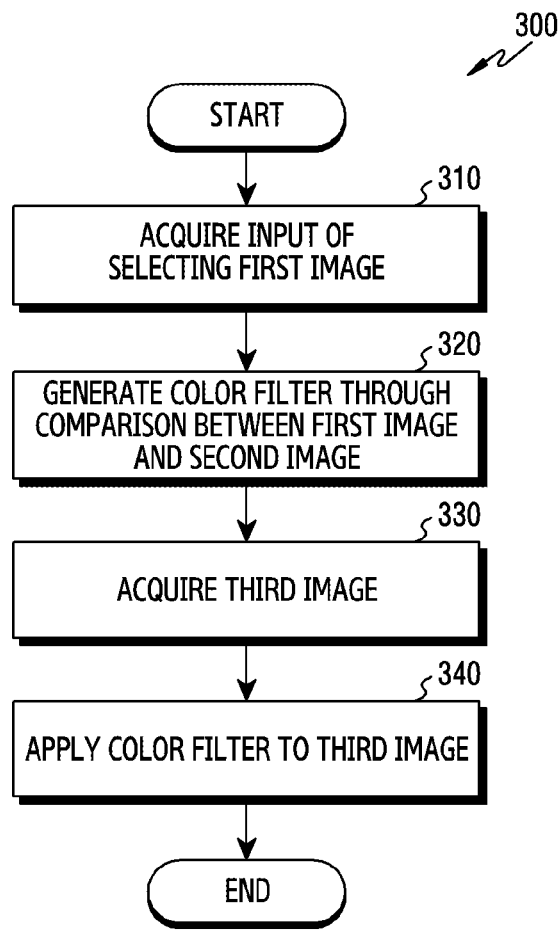
FIG. 3 illustrates a process in which an electronic device generates and applies a color filter through comparison between a first image and a second image according to an embodiment.

FIG. 3 is a flowchart 300 illustrating a method of generating a new image by an electronic device according to an embodiment.

According to an embodiment, in operation 310, the processor 120 may acquire an input of selecting a first image. The first image may include an image stored in an album application of the electronic device. The first image may include an image captured using a camera of the electronic device by the user and an image generated on the basis of information acquired through an image sensor. The first image may include an image transmitted and acquired from another electronic device. The first image may include an image downloaded from a specific server of the Internet. According to an embodiment, the first image may include a captured image generated using a screen capture function of the electronic device. The captured image may include at least one captured image among a background screen of the electronic device, an application execution screen, and a call screen. The capture function may be performed in such a manner that the user presses a specific button or makes a specific motion by a his/her hand on a display. The processor 120 may configure the first image as a target image for extracting color data in response to selection of the stored first image through the album application by the user.

According to an embodiment, in operation 320, the processor 120 may generate a color filter through comparison between the first image and a second image. For example, the processor 120 may generate a color filter by comparing color values of pixels corresponding to each other in the first image and the second image. The processor 120 may match the first image and the second image and compare color values for overlapping pixels. For example, the first image and the second image may include color elements of red (R), green (G), and blue (B), and the processor 120 may determine R, G, and B in the second image changed from R, G, and B values of the first image. For example, R, G, and B may have values between 0 to 255, and the R value corresponding to 120 in the first image and the R value corresponding to 135 in the second image. The processor may acquire data indicating R, G, and B values in the second image changed from all R, G, and B values included in the first image.

According to an embodiment, the processor 120 may generate two or more color filters in response to a user input of adding the color filters. For example, in the state in which one color filter exists, the number of color filters may become two in response to the user input of adding the color filter.

According to an embodiment, the floor filter may be implemented as a function derived through color value comparison, a coefficient of the function, or a color lookup table generated on the basis of the derived function and the coefficient of the function. The function, the coefficient of the function, and the color lookup table are described in detail with reference to FIG. 6 below.

According to an embodiment, in operation 330, the processor 120 may acquire a third image. The third image may include at least one of a first preview image acquired through a camera module (for example, 180 of FIG. 1) or an image stored in a memory (for example, the memory 130 of FIG. 1). The third image may include an image generated on the basis of information acquired through an image sensor (for example, the image sensor 230 of FIG. 2). The third image may include an image obtained by storing the generated image in the memory 130. The processor 120 may configure the third image as a target image to which color data is applied in response to selection of the stored third image through the album application by the user.

According to an embodiment, in operation 340, the processor 120 may apply the color filter generated through comparison between the first image and the second image to the third image. The processor 120 may generate a fourth image by applying the color filter to the third image. For example, R having a value of 135 in the third image may be converted into R having a value of 120 in the fourth image. The processor 120 may apply the derived function to the third image. The processor 120 may generate the fourth image by receiving a color value of each of R, G, and B in every pixel for the third image corresponding to a new image and performing calculations.

Figure 4:
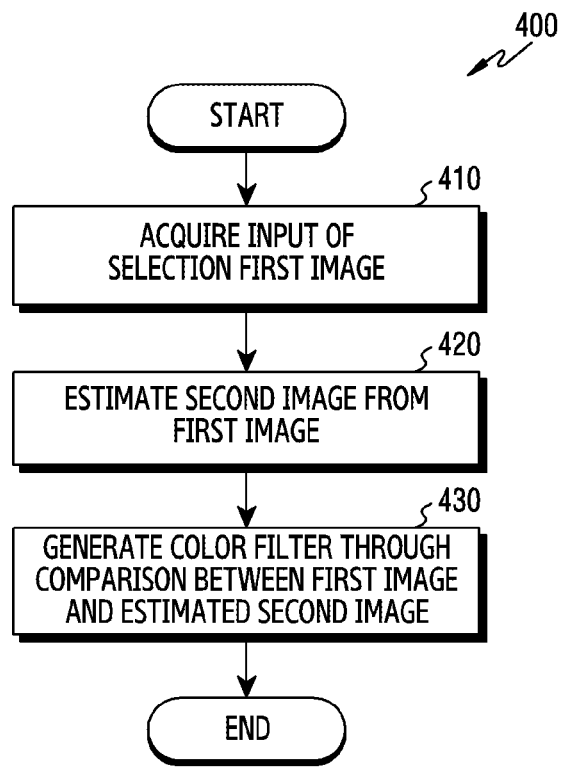
FIG. 4 illustrates a processor of generating a color filter by estimating the second image from the first image according to an embodiment.

FIG. 4 is a flowchart 400 illustrating a process of generating a color filter by an electronic device according to an embodiment.

According to an embodiment, in operation 410, the processor 120 may acquire an input of selecting a first image. When the user input of selecting the first image is acquired, the processor 120 may display the first image on the display.

The first image may be an image to which the filter effect is applied. For example, the first image may be an image to which at least one a filter giving a black and white effect, a filter giving faded feeling, or a filter giving pastel tones is applied. As the color filters, various filters may exist as well as the listed filters.

According to an embodiment, in operation 420, the processor 120 may estimate the second image from the first image. The processor 120 may estimate the second image which is the original image to which no color filter is applied from the image to which the filter is applied. The processor 120 may estimate the second image on the basis of an average characteristic of objects within the first image. The processor 120 may recognize objects included in the first image and estimate the original image by estimating an average color of the objects. For example, the processor 120 may recognize an object (for example, grass or sea) included in the first image and recognize that grass or sea has a grey color since the black and white filter is applied to the first image. When the black and white filter is applied to the first image and thus grass or sea has a grey color, the grass may averagely include a green color and the sea may averagely include a blue color, and thus the grass may have a green color and the sea may have a blue color in the second image corresponding to the original image. That is, the processor 120 may estimate the second image corresponding to the original image by estimating an average color (for example, blue color) of the object (for example, sea) in the grey color of the object (ex, sea) included in the first image.

The estimation scheme may be performed through the application of machine learning, bigdata technology, or artificial intelligence (AI), and data learned through the estimation may be stored in the memory 130 by at least one of machine learning, bigdata technology, or artificial intelligence (AI).

According to an embodiment, in operation 430, the processor 120 may generate a color filter through comparison between the first image and the estimated second image. The processor 120 may generate a color filter by comparing color values of the first image and the estimated second image. The processor 120 may generate a color filter by comparing color values of the first image and the estimated second image. Each of the first image and the second image may include color elements of red (R), green (G), and blue (B), and the processor 120 may determine R, G, and B in the second image changed from R, G, and B values of the first image. For example, each of R, G, and B may have a value between 0 and 255, and an R value corresponding to 120 in the first image may have an R value of 135 in the second image. The processor may acquire data indicating R, G, and B values in the second image changed from all R, G, and B values included in the first image.

Figure 5:
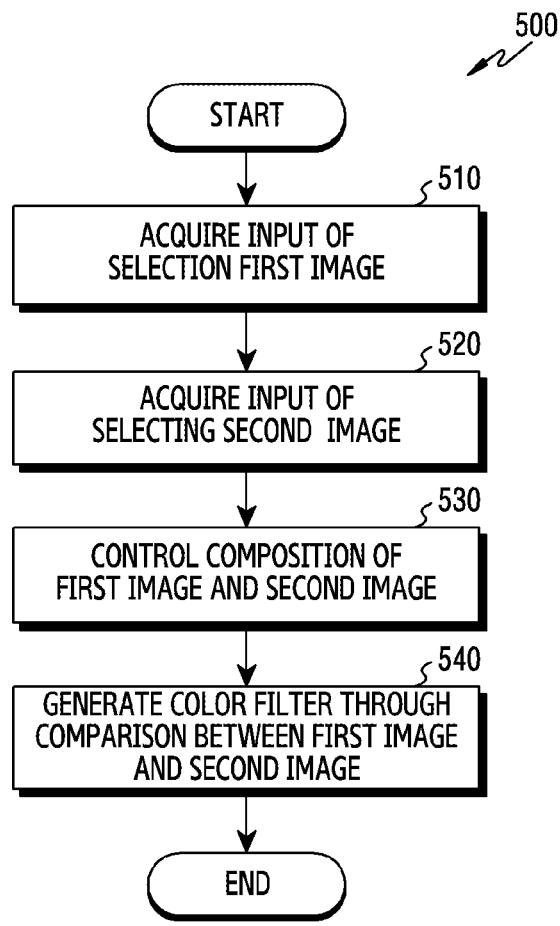
FIG. 5 illustrates a processor of generating a color filter by acquiring an input of selecting the second image according to an embodiment.

FIG. 5 is a diagram 500 illustrating a process of generating a color filter by acquiring an input of selecting a second image according to an embodiment.

According to an embodiment, in operation 510, the processor 120 may acquire an input of selecting a first image. When the user input of selecting the first image is acquired, the processor 120 may display the first image on the display.

According to an embodiment, in operation 520, the processor 120 may acquire an input of selecting a second image. The processor 120 may acquire a user input of selecting the second image. According to an embodiment, the first image may be an image captured in the same place as the second image. The second image may be an image captured at a different time from the first image. For example, the first image may be an image captured at dusk, and the second image may be an image obtained by capturing the same object included in the first image at noon.

According to an embodiment, in operation 530, the processor 120 may control compositions of the first image and the second image. The processor 120 may control the compositions in order to compare the first image and the second image. The processor 120 may recognize objects existing within the first image and objects existing within the second image. The objects existing within the first image may be the same as the objects existing within the second image. The second image may include a second object which is the same as a first object included in the first image. The at least one processor may control the composition of the second image such that the first object overlaps the second object. When the compositions of the first image and the second image are the same like in the case in which the image is captured by a fixed camera, the operation of controlling the composition may be omitted.

According to an embodiment, the processor 120 may control the composition by determining whether the first image and the second image match each other. The processor 120 may search for feature points of the first image and the second image and extract feature describers for the feature points. The feature points may be predetermined parts for defining the corresponding image, and the feature describers may express the corresponding feature area through a vector value. For example, the feature point may be an outline or a central point included in the image, and the feature describer may be a value expressing displacement of each point included in the outline or the central point.

According to an embodiment, the processor 120 may perform control to detect an object in an input image (for example, the first image), recognize the detected object to select a tracked object, configure a configuration component for an object area of the tracked object in the input image, track the tracked object in a newly input image (for example, the second image), and adjust the composition to arrange the object area of the tracked object in the image by the configured composition. The processor 120 may store information on at least one object in the memory 130.

A scheme for controlling the compositions of the first image and the second image is only to indicate an embodiment, and the scheme for controlling the composition according to the disclosure is not limited by the description.

According to an embodiment, in operation 540, the processor 120 may generate a color filter through comparison between the first image and a second image. The processor 120 may generate a color filter through comparison between the controlled second image and the first image. The processor 120 may draw a function and a coefficient of the function through comparison between color values of the controlled second image and the first image and generate a color lookup table on the basis of the drawn function and coefficient of the function.

Figure 6:
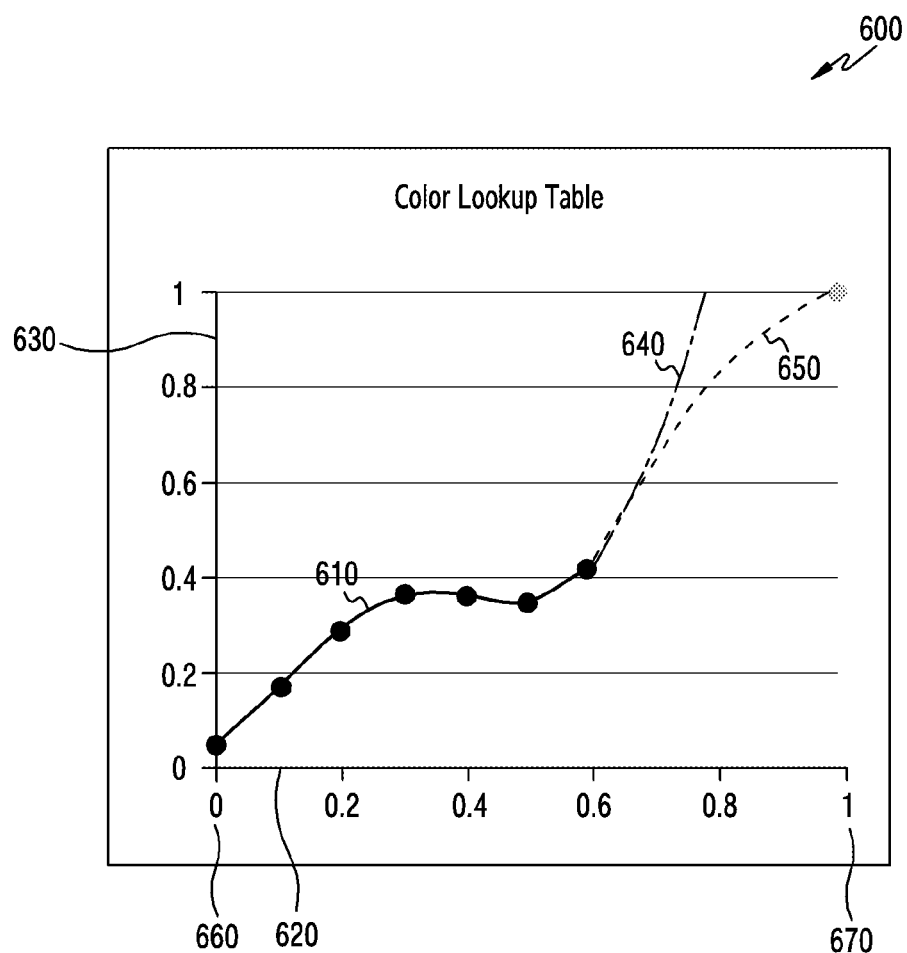
FIG. 6 is a color lookup table generated through comparison between the first image and the second image according to an embodiment.

FIG. 6 is a color lookup table 600 generated through comparison between a first image and a second image according to an embodiment.

The color lookup table 600 may include a function 610 drawn through matching of color values of the first image and the second image and information on a coefficient of the function. The function 610 may be a third-order or greater non-linear polynomial or a trigonometric function. The trigonometric function 610 may be, for example, $y=-51.22*x^6+93.254*x^5-41.99*x^4-2.6722*x^3+2.5786*x^2+0.9984*x+0.05$. The processor 120 may store the function in the memory 130 or store −51.22, 93.254, −41.99, −2.6722, 2.5786, 0.9984, 0.05 corresponding to coefficients of the function in the memory 130. The processor 120 may store information indicating a hexadecimal function as well as the function of the coefficients of the function in the electronic device 101. The memory 130 may store at least one piece of filter data including at least one piece of object information or capturing information.

The processor 120 may generate a color lookup table for each of red (R), green (G), and blue (B). The processor 120 may calculate a result value of the function to generate the color lookup table for each of R, G, and B and store the color lookup table in the memory 130.

According to an embodiment, an x axis 620 may be color values of pixels of the second image, and a y axis 630 may be color values of pixels of the first image. The x axis 620 of the color lookup table 600 indicates normalization of color values 0 to 255 into values 0 to 1, wherein a number 660 of 0 shown in the x axis 620 may mean that the color value is 0 and a number 670 of 1 shown in the x axis 620 may mean the color value 255. This may also be applied to the y axis 630.

According to an embodiment, there may no pixel color value of the first image or the second image in the color lookup table 600. The processor may correct the color lookup table by mapping the pixel color value which does not exist in the second image to a predetermined pixel color value. When there is no maximum value or minimum value of one of R, G, and B which do not exist in the second image (for example, function graph 640 of FIG. 6), the processor 120 may map the maximum value of one thereof to 255 and accurately or approximately map the minimum value of one thereof to 0 as shown in a function graph 650 of FIG. 6. For example, when there is no R value corresponding to 230 in the second image, the processor 120 may match the R value corresponding to 230 in the second image and the R value corresponding to 220 in the first image to correct the color lookup table. Further, it is possible to correct the color lookup table by matching the R value corresponding to the maximum value (for example, 255) in the second image and the R value corresponding to the maximum value (for example, 255) in the first image. The processor 120 may prevent the generation of clipping for a color which does not exist in the second image through the correction when the color filter is applied to a new image.

According to an embodiment, the processor 120 may correct the function 610 and the color lookup table 600 to prevent a rapid change in the function. For example, when coefficients of the function are calculated through matching between pixel color values, a change in the function may be unintentionally large if there is a part having a great change in a few of pixel color values unlike the conventional pattern. The case in which the great change appears unlike the conventional pattern may include the case in which, even though a color value for R of the first image is 40 and a normal color value for R of the second image matching the color value 40 is 60, the color value for R of the second image matching the color value 40 is 150. The processor 120 may correct the function 610 and the color lookup table 600 such that the change in the function is not great by changing the coefficients of the function. The processor 120 may generate a resultant image (for example, fourth image) to which the filter effect is naturally applied by correcting a function shape in the curved form that is excessively sharply bent and applying the corrected function to the third image.

According to an embodiment, the corrected function, coefficients of the function, or color lookup table may be stored in the memory 130 and continuously applied to new images.

Figure 7:
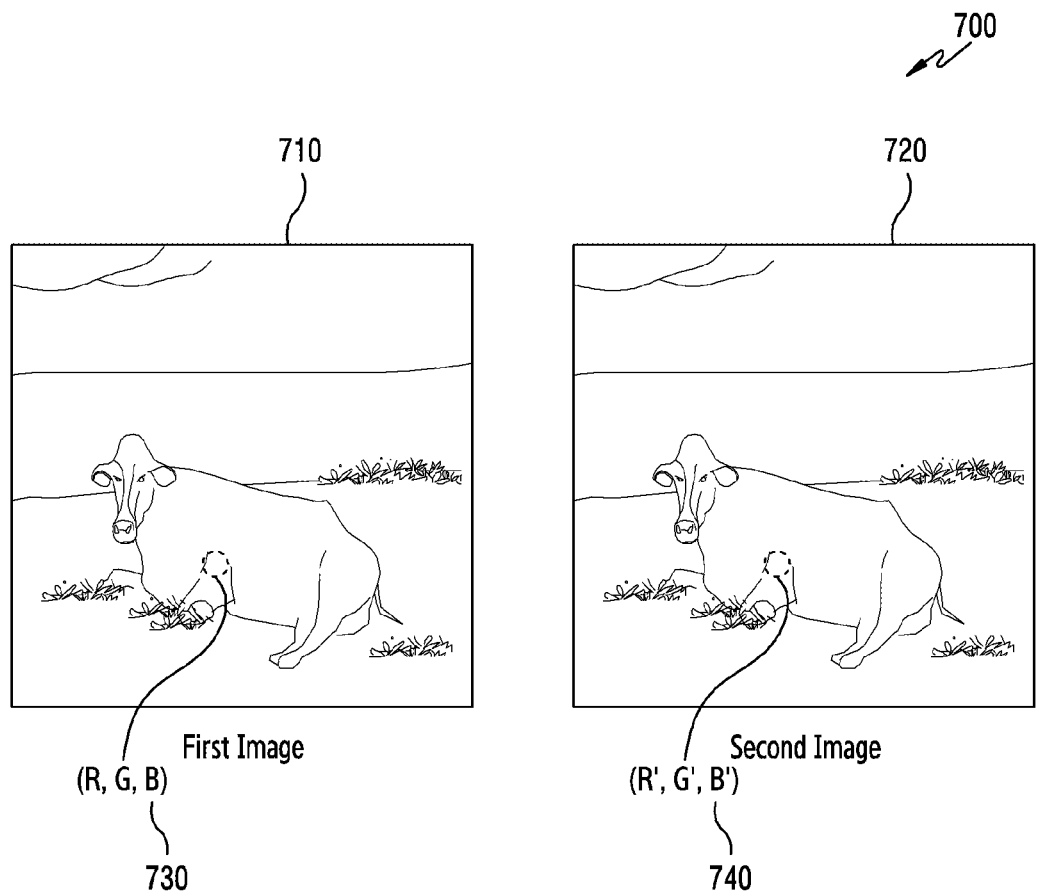
FIG. 7 illustrates the first image and the second image displayed on the electronic device according to an embodiment.

FIG. 7 is a diagram 700 illustrating a first image and a second image displayed on the electronic device according to an embodiment.

According to an embodiment, a first image 710 may be an image to which a filter effect which the user desires is applied. The first image 710 may be referred to as a style image or a filter image. The first image 710 may include at least one of red (R), green (G), or blue (B) color value in every pixel. A second image 720 may include at least one of red (R), green (G), or blue (B) color value in every pixel. The second image 720 may be an image estimated from the first image 710. The second image 720 may be an image estimated on the basis of an average characteristic of objects within the first image 710. The second image 720 may include the same object (for example, cow) included in the first image 710. The second image 720 may be an image having a color value distinguished from the first image 710.

R, G, and B values 740 of the second image 720 may be distinguished from R, G, and B values 730 of the first image 710. For example, the R, G, and B values may have values between 0 and 255, and the R value corresponding to 120 in the first image 710 may match the R value corresponding to 135 in the second image 720. The processor 120 may generate a color filter through comparison between color values for corresponding pixels of the first image 710 and the second image 720.

Figure 8:
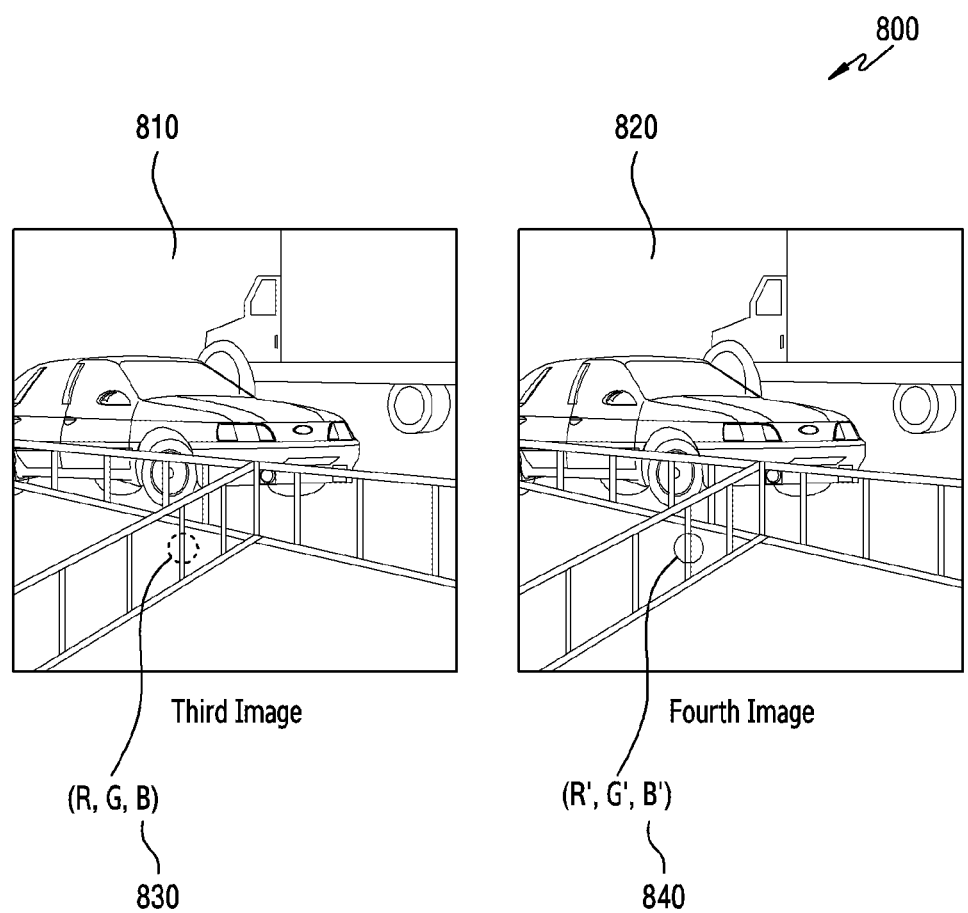
FIG. 8 illustrates a third image and a fourth image displayed on the electronic device according to an embodiment.

FIG. 8 is a diagram 800 illustrating a third image and a fourth image displayed on the electronic device according to an embodiment.

According to an embodiment, the third image 810 may be a target image to which the user desires to apply a filter. The third image 810 may include an image stored in the memory 130 of the electronic device 101 or an image acquired through the camera module 180 and shown as a preview. The third image 810 may include an image displayed on the display during a video call.

According to an embodiment, the processor 120 may generate a fourth image 820 by applying a color filter to the third image 810. The processor 120 may generate the fourth image 820 having a different color pattern by applying the generated color filter to the third image 810. The third image 810 and the fourth image 820 may include at least one of red (R), green (G), and blue (B) in every pixel, and R, G, and B values 840 of the fourth image 820 may be distinguished from R, G, and B values 830 of the third image 810. For example, the R value in the third image 810 may be 135 and the R value in the fourth image 820 may be 120.

According to an embodiment, the processor 120 may generate the fourth image 820 to which a black and white filter is applied by applying the black and white filter to the third image 810 through comparison between the first image 710 to which the black and white filter is applied and the second image 720 originally estimated from the first image. The fourth image 820 may include the same object (for example, taxi) included in the third image 810. The third image 810 may include an object (for example, taxi) having a yellow color. The fourth image 820 may include an object (for example, taxi) having a grey color through the application of the black and white filter.

According to an embodiment, the processor 120 may perform control to acquire an input of storing the generated color filter and store the generated color filter in the memory. The processor 120 may generate the fourth image 820 by applying the stored color filter. When the third image 810 is a preview acquired through the camera module 180, the processor 120 may control the camera module 180 to output the fourth image 820 as the preview acquired through the camera module 180.

Figure 9:
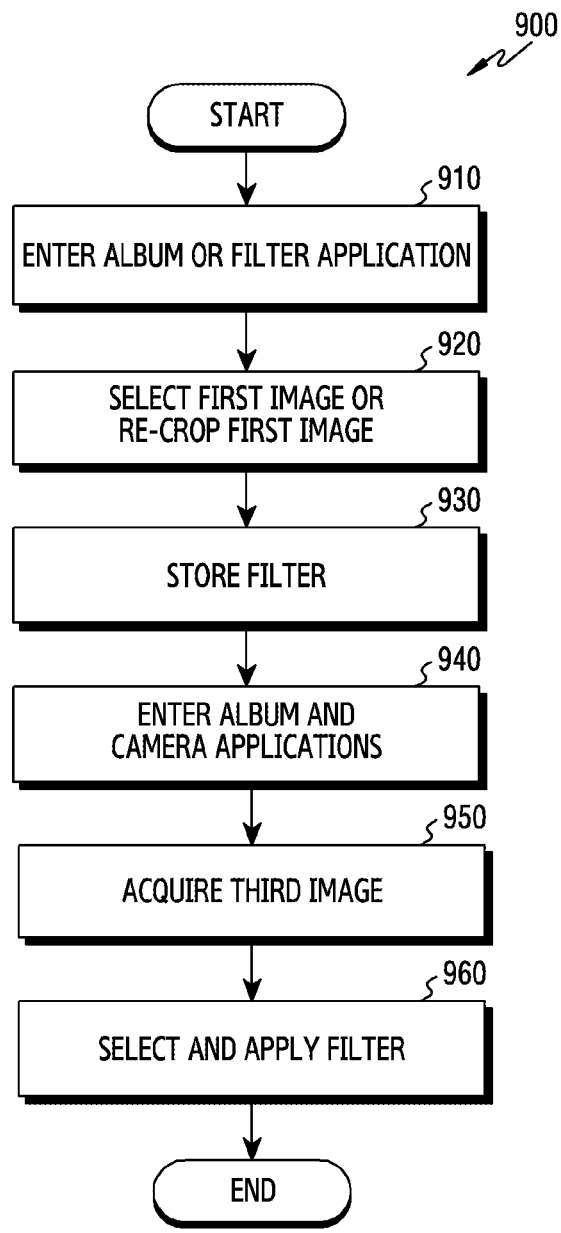
FIG. 9 is a flowchart illustrating a process in which a user of the electronic device generates a filter and applies the filter according to an embodiment.

FIG. 9 is a flowchart 900 illustrating a process in which a user of the electronic device generates a filter and applies the same according to an embodiment.

According to an embodiment, in operation 910, the processor 120 may acquire an album or filter application input. The processor 120 may execute the application in response to the application input of the user.

According to an embodiment, in operation 920, the processor 120 may acquire an input of selecting a first image. The processor 120 may acquire an input of re-cropping the first image.

According to an embodiment, in operation 930, the processor 120 may generate a filter after acquiring the input of selecting the first image. The processor 120 may store the generated filter in the memory 130 in response to a user input of storing the generated filter.

According to an embodiment, in operation 940, the processor 120 may acquire an album or filter application input. The processor 120 may execute the application in response to the application input of the user.

According to an embodiment, in operation 950, the processor 120 may acquire a third image. The processor 120 may acquire the third image corresponding to an image to which the user desires to apply a filter. The third image may include at least one of an image stored in the memory 130 of the electronic device 101 or an image acquired through the camera module 180 and shown as a preview.

According to an embodiment, in operation 960, the processor 120 may apply the selected filter to the third image in response to a user input of selecting and applying the filter.

Figure 10:
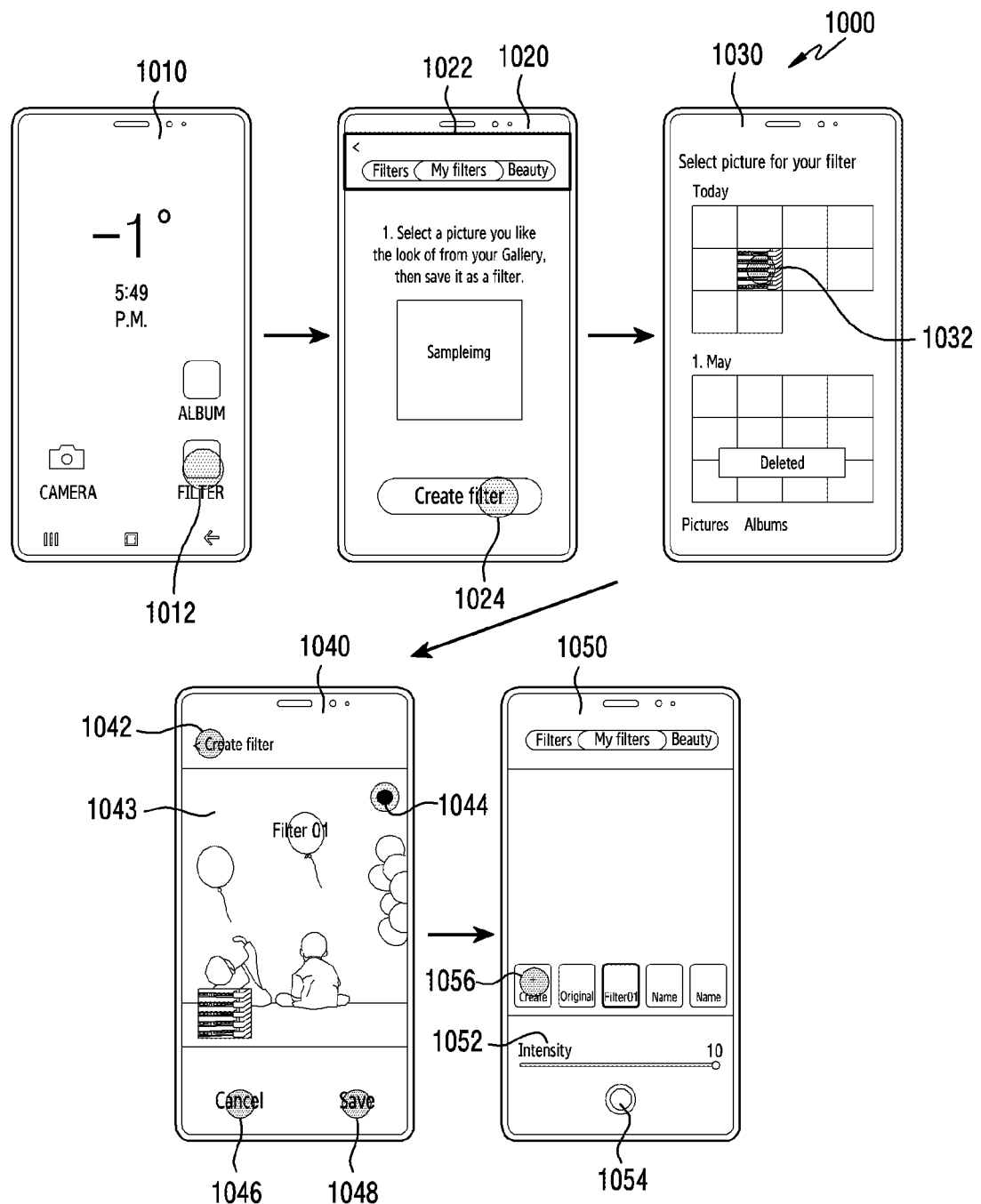
FIG. 10 illustrates a screen of generating a filter in the electronic device according to an embodiment.

FIG. 10 is a diagram 1000 illustrating a screen of generating a filter in the electronic device according to an embodiment.

According to an embodiment, the electronic device 101 may display a screen 1050 on the display device 160. The screen 1050 may include indications of information such as time, temperature, and the like, and also include application icons such as a camera, an album, and the like. The screen 1010 may include a filter application icon. The applications may include at least one of a camera application, an album application, or a filter application. The processor 120 may display a screen 1020 on the display in response to a user input 1012 of pressing the application.

According to an embodiment, the electronic device 101 may display the screen 1020 on the display device 160. The processor 120 may display a function of filters, my filters, or beauty on an upper part 1022 of the screen 1020. The processor 120 may display a screen 1030 on the display device 160 in response to a user input 1024 of pressing a filter-creating button.

According to an embodiment, the electronic device 101 may display the screen 1030 on the display device 160. The processor 120 may display an image list to select an image for which the user makes a filter on the screen 1030. The processor 120 may display a screen 1040 on the display device 160 in response to a user input 1032 of pressing an image.

According to an embodiment, the electronic device 101 may display the screen 1040 on the display device 160.

According to an embodiment, the processor 120 may display a preview image 1043 acquired from a camera on the screen 1040. The processor 120 may display an image to which the filter is not applied on the display 160 in response to a user input 1044 of performing a long tap on a portion of the preview image 1043 included in the screen 1040. For example, when the user presses the part of the display on which the preview image is displayed for one second, the processor 120 may stop displaying the preview image to which the filter is applied and display an image to which the filter is not applied.

According to an embodiment, the processor 120 may stop displaying the screen 1040 and display the screen 1030 in response to a user input 1046 of pressing a cancel button. The processor 120 may stop displaying the screen 1040 and display the screen 1030 in response to the user input 1042 of pressing the filter-creating button. The processor 120 may store the generated color filter in response to a user input 1048 of pressing a save button and enters a screen 1050 of displaying the generated color filter.

According to an embodiment, the electronic device 101 may display the screen 1050 on the display device 160. The processor 120 may display a list of the generated color filter in horizontal arrangement on the display device 160. The processor 120 may additionally generate a filter in response to a user input 1056 of pressing a filter addition icon arranged in the leftmost side of the color filter list. The user may control intensity of the filter effect displayed on the screen 1050. For example, the intensity of the filter effect may include a first level to a tenth level. The electronic device 101 may acquire an image to which the filter is applied in response to a user input of pressing a button 1054.

A scheme of outputting a process in which the processor generates a filter to the display device 160 is not limited to the embodiment illustrated in FIG. 10, and may be displayed in various ways.

Figure 11:
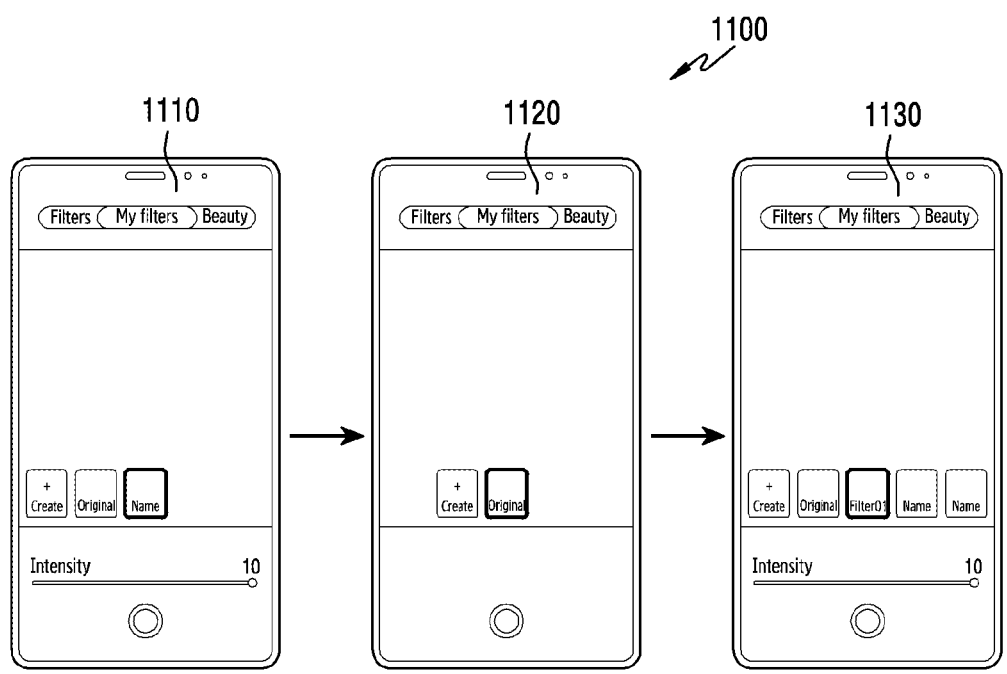
FIG. 11 illustrates a screen of adding or removing a filter in the electronic device according to an embodiment.

FIG. 11 is a diagram 1100 illustrating a screen in which the electronic device adds or removes a filter according to an embodiment.

According to an embodiment, the processor 120 may display a screen 1110, which is displayed after a color filter is generated, on the display device 160. The screen 1110 may include a filter-creating icon, an icon for an image to which a filter is not applied, and a generated filter icon.

According to an embodiment, when all of the generated color filters are removed, the processor 120 may display the filter-creating icon and the icon for the image to which the filter is not applied on a lower part of the screen 1120. According to an embodiment, a screen 1130 displayed on the electronic device 101 may include a screen displaying various generated color filters. Icons of the various generated color filters may be arranged on the lower end of the screen 1130. The processor 120 may limit the maximum number (for example, 99) of filters which can be generated. The processor 120 may display a warning message on a part of the screen when the filter-creating input is acquired in the state in which the number of filters reaches the maximum number of filters which can be generated. For example, the warning message may include at least one of 'no more filter can be generated' or 'a first number or more of filters cannot be generated'.

Figure 12:
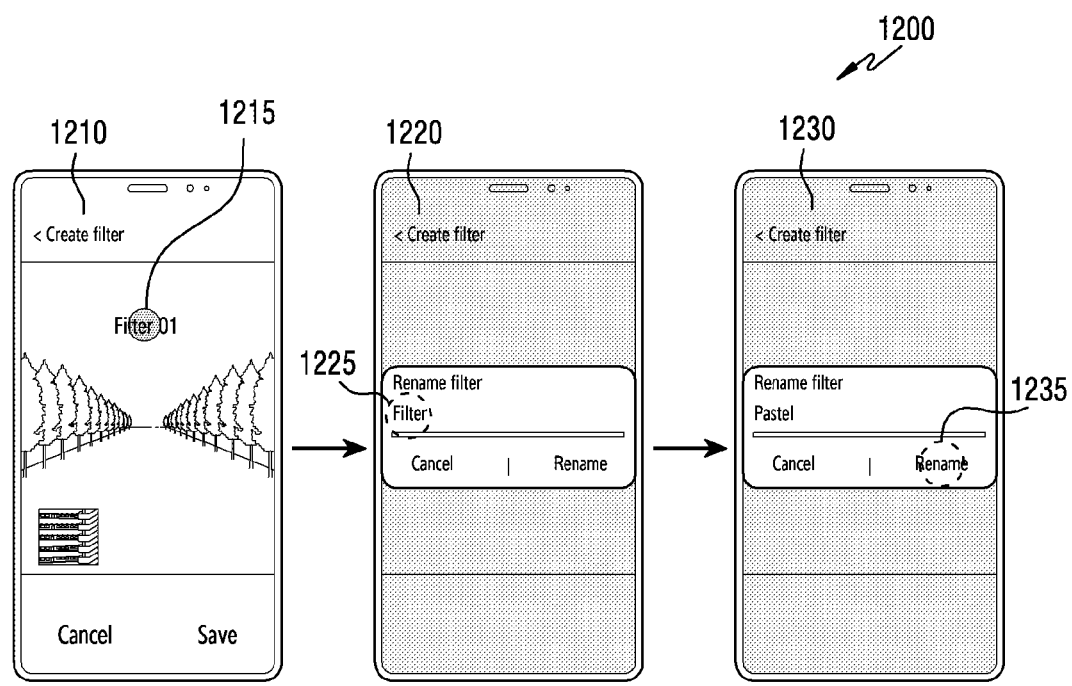
FIG. 12 illustrates a screen of changing a name of a color filter in the electronic device according to an embodiment.

FIG. 12 is a diagram 1200 illustrating a screen in which the electronic device changes a color filter name according to an embodiment.

According to an embodiment, the processor 120 may display a screen 1220 on the display device 160 to reconfigure a filter name in response to a user input 1215 of pressing a filter name displayed on an upper part of the display. The processor 120 may display the screen 1220 on the display device 160 and display an overlay keyboard on a part of the screen in response to the user input 1215. The processor 120 may display a separate indication and an overlay keyboard showing the current filter name to allow the user to correct the filter name on a part of the screen. When the user inputs letters, the processor 120 may acquire the letter input and display the letters on the display device 160 in response to the user's letter input. The processor 120 may reconfigure a filter name in response to a user input of pressing an icon for reconfiguring a filter name after the user makes the filter name through a keyboard input.

According to an embodiment, the processor 120 may deactivate a rename button when the user does not input the filter name and may activate the rename button when the user changes at least one letter. When the rename button is deactivated, the user cannot press the rename button through the display device.

According to an embodiment, the processor 120 may limit the number of letters of the filter name to a first number of letters. The processor 120 may display a warning message on the display device 160 in response to a user input of writing one letter in the state in which the first number of letters has been input. The warning message may include at least one of 'no more letters can be input' or 'the first number or more of letters cannot be input'.

Figure 13:
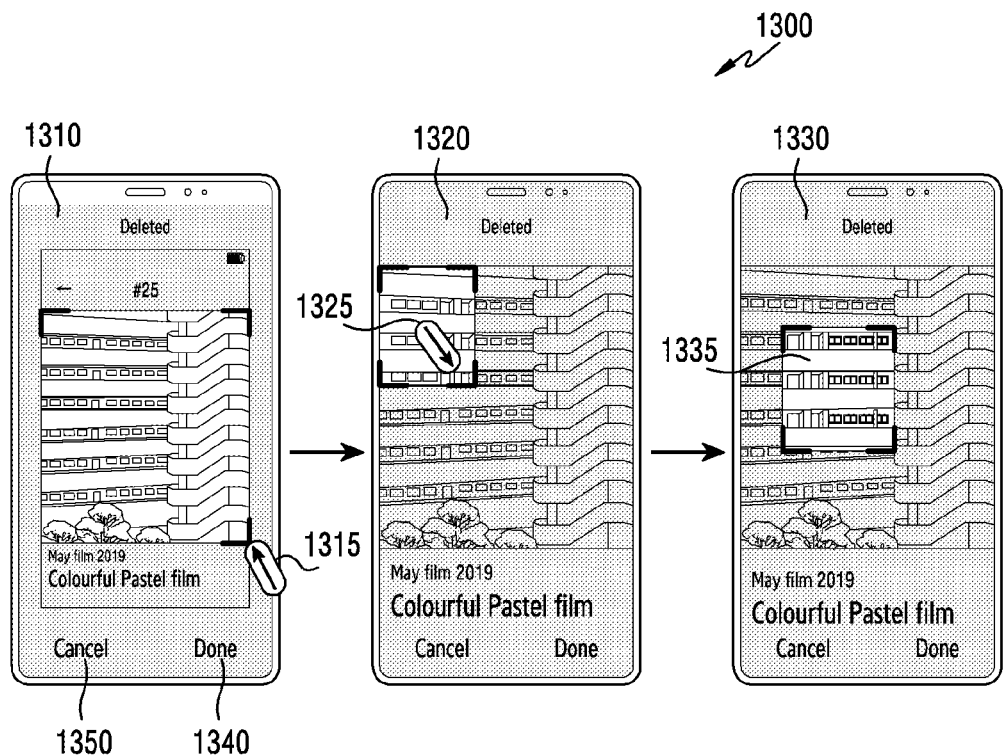
FIG. 13 illustrates a screen of re-cropping the first image in the electronic device according to an embodiment.

FIG. 13 is a diagram 1300 illustrating a screen of re-cropping the first image in the electronic device according to an embodiment.

According to an embodiment, the processor 120 may display a screen 1310 on the display device 160 in response to a user input of pressing an image displayed on a part of the screen (for example, the screen 1040 of FIG. 10). The electronic device 101 may display the re-crop screen 1310 on the display device 160 of the electronic device 101 to allow the user to re-crop the first image. The user may change a crop area by moving a corner handler 1315 of the crop area, and the processor 120 may display the changed crop area on the display device 160 in response to a user's change input. For example, a scheme of changing the crop area may include a scheme for acquiring an input 1325 of expanding the crop area on the fixed image of the screen 1320 and a scheme of acquiring an input of moving a crop area 1335 on the fixed image of the screen 1330. The processor 120 may limit the size of the crop area to a first size.

According to an embodiment, the processor 120 may generate a cropped image in response to a user input of pressing a done button 1340. The cropped image may be the first image corresponding to the target image from which the filter is extracted in the memory 130. The processor 120 may stop displaying the screen 1310 and display a screen (for example, the screen 1040 of FIG. 10) in response to a user input of pressing the cancel button 1350.

In various embodiments, the electronic device 101 may include the camera, the display, the memory 130, and at least one processor 120 electrically connected to the display and the memory. The at least one processor may acquire an input of selecting the first image, generate a color filter through comparison between the first image and a second image having a color pattern different from the first image, acquire a third image, and apply the generated color filter to the third image.

In an embodiment, the at least one processor may estimate the second image from the first image.

In an embodiment, the at least one processor may estimate the second image, based on an average characteristic of objects within the first image.

In an embodiment, the at least one processor may acquire an input of selecting the second image.

In an embodiment, the second image may include a second object which is an object equal to a first object included in the first image, and the at least one processor may control a composition of the second image to overlap the first object with the second image and generate the color filter through comparison between the second image having the controlled composition and the first image.

In an embodiment, the processor 120 may store the generated color filter in the memory 130.

In an embodiment, the at least one processor 120 may generate a fourth image by applying the generated or stored color filter to the third image.

In an embodiment, the color filter may include at least one of a function drawn through comparison between color values of pixels of the first image and the second image, coefficients of the function, or a color lookup table for the drawn function.

In an embodiment, the at least one processor 120 may correct the color lookup table by mapping a color value of a pixel which does not exist in the second image to a color value of a predetermined pixel.

In an embodiment, when there is no maximum value or minimum value of one of R, G, and B which do not exist in the second image, the at least one processor 120 may map the maximum value of one thereof to 255 or map the minimum value of one thereof to 0.

In an embodiment, the third image may include at least one of a first preview image acquired through the camera or an image stored in the memory.

In various embodiments, a method of controlling an electronic device may include an operation of acquiring an input of selecting a first image by at least one processor electrically connected to a camera, a display, and a memory, an operation of generating a color filter through comparison between the first image and a second image having a color pattern different from the first image, an operation of acquiring a third image, and an operation of applying the generated color filter to the third image.

In an embodiment, the method of controlling the electronic device may include an operation of estimating the second image from the first image.

In an embodiment, the method of controlling the electronic device may include an operation of estimating the second image, based on an average characteristic of objects within the first image.

In an embodiment, the method of controlling the electronic device may include an operation of acquiring an input of selecting the second image.

The method of controlling the electronic device according to an embodiment, the second image may include a second object which is an object equal to a first object included in the first image. In the method of controlling the electronic device, the at least one processor may include an operation of controlling a composition of the second image to overlap the first object with the second object and an operation of generating the color filter through comparison between the second image having the controlled composition and the first image.

In an embodiment, the method of controlling the electronic device may include an operation of storing the generated color filter in the memory.

In the method of controlling the electronic device according to an embodiment, the at least one processor may generate a fourth image by applying the generated or stored color filter to the third image.

In the method of controlling the electronic device according to an embodiment, the color filter may include at least one of a function drawn through comparison between color values of pixels of the first image and the second image, coefficients of the function, and a color lookup table for the drawn function. The method of controlling the electronic device according to an embodiment may include an operation of mapping a color value of a pixel which does not exist in the second image to a color value of a predetermined pixel and an operation of correcting the color lookup table through the mapping operation.

The method of controlling the electronic device according to an embodiment may include an operation of, when there is no maximum value or minimum value of one of R, G, and B which do not exist in the second image, mapping the maximum value of one thereof to 255 or mapping the minimum value of one thereof to 0.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
   a camera;
   a display;
   memory storing instructions; and
   at least one processor,
   wherein the instructions, when executed by the at least one processor, cause the electronic device to:
      control the display to display a first icon for adding a color filter to a filter list of the electronic device and a target image,
      acquire a first user input for selecting the first icon,
      based on acquiring the first user input, control the display to display an image list corresponding to a plurality of images stored in the memory, wherein the plurality of images included in the image list are used to generate a color filter to be added to the filter list,
      acquire a second user input for selecting a first image from the plurality of images,
      based on acquiring the second user input, generate a color filter based on the first image, and
      control the display to display a second icon representing the generated color filter and a fixed image in which the generated color filter is applied to the target image.

2. The electronic device of claim 1, wherein the target image includes at least one image acquired through the camera of the electronic device or an image stored in the memory.

3. The electronic device of claim 2, wherein the instructions, when executed by the at least one processor, cause the electronic device to store the generated color filter in the memory of the electronic device.

4. The electronic device of claim 1, wherein the plurality of images includes at least one image acquired through the camera of the electronic device and at least one image acquired from a server.

5. The electronic device of claim 1, wherein the instructions, when executed by the at least one processor, cause the electronic device to:
   control the display to display a third icon for a name of the generated color filter;
   acquire a third user input for selecting the third icon;
   based on acquiring the third user input, control the display to display a visual object for obtaining the name of the generated color filter;
   obtain the name of the color filter based on a fourth user input for the visual object; and
   control the display to display the obtained name of the color filter in association with the second icon.

6. The electronic device of claim 1, wherein the instructions, when executed by the at least one processor, cause the electronic device to:
   generate a second image with a color pattern different from a color pattern of the first image; and
   generate the color filter using the first image and the second image.

7. The electronic device of claim 6, wherein the instructions, when executed by the at least one processor, cause the electronic device to:
   generate the second image based on a characteristic of at least one object in the first image.

8. The electronic device of claim 6, wherein the color filter includes at least one of a function derived by comparing color values of pixels of the first image and the second image, coefficients of the function, or a color lookup table.

9. The electronic device of claim 6, wherein the instructions, when executed by the at least one processor, cause the electronic device to:
   match the first image to the second image;
   compare color values of overlapping pixels based on the matching; and
   generate the color filter based on the comparison.

10. The electronic device of claim 6, wherein the second image corresponds to an original image of the first image, and
   wherein the instructions, when executed by the at least one processor, cause the electronic device to generate the second image using at least one of machine learning, big data technology, or artificial intelligence.

11. The electronic device of claim 1, wherein the instructions, when executed by the at least one processor, cause the electronic device to provide a GUI (graphical user interface) for controlling intensity of a filter effect of the generated color filter.

12. A method of controlling an electronic device, the method comprising:
   displaying, on a display of the electronic device, a first icon for adding a color filter to a filter list of the electronic device and a target image,
   acquiring a first user input for selecting the first icon,
   based on acquiring the first user input, displaying an image list corresponding to a plurality of images stored in a memory of the electronic device, wherein the plurality of images included in the image list are used to generate a color filter to be added to the filter list,
   acquiring a second user input for selecting a first image from the plurality of images;
   based on acquiring the second user input, generating a color filter based on the first image; and
   displaying a second icon representing the generated color filter and a fixed image in which the generated color filter is applied to the target image.

13. The method of claim 12, wherein the target image includes at least one image acquired through a camera of the electronic device or an image stored in the memory.

14. The method of claim 12, comprising:
   displaying a third icon for a name of the generated color filter;
   acquiring a third user input for selecting the third icon;
   based on acquiring the third user input, displaying a visual object for obtaining the name of the generated color filter;
   obtaining the name of the color filter based on a fourth user input for the visual object; and
   displaying the obtained name of the color filter in association with the second icon.

15. The method of claim 12, comprising:
   generating a second image with a color pattern different from a color pattern of the first image; and generating the color filter using the first image and the second image.

16. One or more non-transitory computer-readable storage media storing one or more programs configured to be executed by one or more processors of an electronic device, the one or more programs including instructions for:
- displaying, on a display of the electronic device, a first icon for adding a color filter to a filter list of the electronic device and a target image;
- acquiring a first user input for selecting the first icon;
- based on acquiring the first user input, displaying an image list corresponding to a plurality of images stored in a memory of the electronic device, wherein the plurality of images included in the image list are used to generate a color filter to be added to the filter list;
- acquiring a second user input for selecting a first image from the plurality of images;
- based on acquiring the second user input, generating a color filter based on the first image; and
- displaying a second icon representing the generated color filter and a fixed image in which the generated color filter is applied to the target image.

* * * * *